(No Model.)

W. BUFFINGTON.
NUT LOCK.

No. 597,260. Patented Jan. 11, 1898.

Witnesses
C. C. Hunt
James F. Duhamel

Inventor
Washington Buffington,
by John Wedderburn
Attorney

UNITED STATES PATENT OFFICE.

WASHINGTON BUFFINGTON, OF PERRY, KANSAS.

NUT-LOCK.

SPECIFICATION forming part of Letters Patent No. 597,260, dated January 11, 1898.

Application filed May 4, 1897. Serial No. 635,044. (No model.)

*To all whom it may concern:*

Be it known that I, WASHINGTON BUFFINGTON, of Perry, in the county of Jefferson and State of Kansas, have invented certain new and useful Improvements in Nut-Locks; and I do hereby declare the following to be a full, clear, and exact description of the invention, such as will enable others skilled in the art to which it appertains to make and use the same.

The invention relates to an improved nut-lock or holder for preventing the accidental displacement or removal of the nut from the bolt consequent upon the jarring of the machinery or other parts to which said bolt and nut are applied.

It consists in the combination, with a coiled or approximately annular spring adapted to snugly clasp the bolt to which it is to be applied, of a screw-threaded keeper-plate having an inturned rib adapted to engage longitudinal grooves in the threaded end of the bolt and thereby to prevent the accidental backing of the nut over which it is placed on the bolt, as hereinafter described and claimed.

Figure 1:
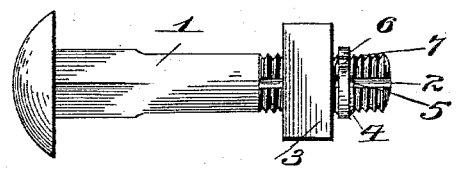
Figure 2:
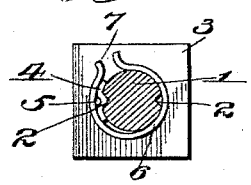
Figure 3:
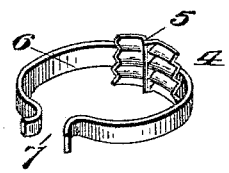
Figure 4:
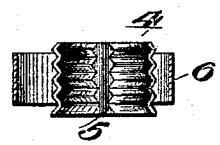

In the accompanying drawings, Figure 1 is a side elevation of a bolt and nut with the improved holder or nut-lock applied; Fig. 2, a transverse section through the bolt and nut holder, showing the nut, outside of which the holder is placed in front elevation. Fig. 3 is a perspective view of the lock or holder detached, and Fig. 4 an inner face view of the screw-threaded holder and a portion of the spring to which it is attached.

1 indicates a bolt of any usual or suitable construction for the purpose for which it is intended, having its screw-threaded end provided with longitudinal grooves 2, arranged on opposite sides of said threaded ends and of a depth not less than the screw-threads thereon. These grooves are made slightly tapering toward the bottom thereof, as indicated in the sectional view Fig. 2. The nut indicated at 3 is of the usual construction. Upon the threaded end of the bolt, outside of the nut, after the latter has been screwed snugly home, I place what I term the "holder" or "keeper" 4, which is made in the form of a short plate screw-threaded on its inner face to engage the threads of the bolt to which it is to be applied and provided with a central inturned transverse rib or flange 5, adapted to engage one of the grooves 2 in the threaded end of the bolt. The keeper or holder 4 thus formed is secured to the inner face of a spring 6, made substantially annular in form and adapted to grasp the end of the bolt outside of the nuts snugly for holding the keeper-plate firmly thereon. The ends 7 of this spring are preferably turned slightly outward to form handles by which the spring can be grasped and held by the attendant or party applying or removing the holder, so that by seizing said ends he may expand the spring slightly for passing the threaded holder over the end of the bolt or for removing it therefrom after the nut has been turned home, as explained. The threaded holder thus placed engages a longitudinal groove in the threaded end of the bolt and being threaded, as described, and engaging said groove any backing of the nut fails effectually to disturb the holder, the latter serving thereby to effectually hold the nut in position until it is removed by hand by relaxing the tension of the spring clasping the bolt, as described.

Having thus described my invention, what I claim as new, and desire to secure by Letters Patent, is—

1. In a nut-lock, the combination with a threaded bolt having longitudinal grooves upon opposite sides thereof, of a spring-plate curved to encircle the bolt, and a plate rigid with said spring-plate and having a plurality of teeth in different vertical planes with a transverse rib intermediate its edges, substantially as and for the purpose specified.

2. In a nut-lock, the combination with a threaded bolt having longitudinal grooves upon opposite sides thereof, of a spring-plate curved to encircle the bolt, and a plate rigid with said spring-plate and having a plurality of teeth in different vertical planes with a transverse rib intermediate its edges, the ends of the spring-plate being disconnected and turned outwardly, substantially as and for the purpose specified.

In testimony whereof I have signed this specification in the presence of two subscribing witnesses.

WASHINGTON BUFFINGTON.

Witnesses:
J. P. KUNKEL,
HENRY SUTTER.